Nov. 17, 1959   W. G. TOLAND ET AL   2,913,059
PLOW BEAM TRIP FOR TWO-WAY PLOW
Filed April 26, 1956   3 Sheets-Sheet 3
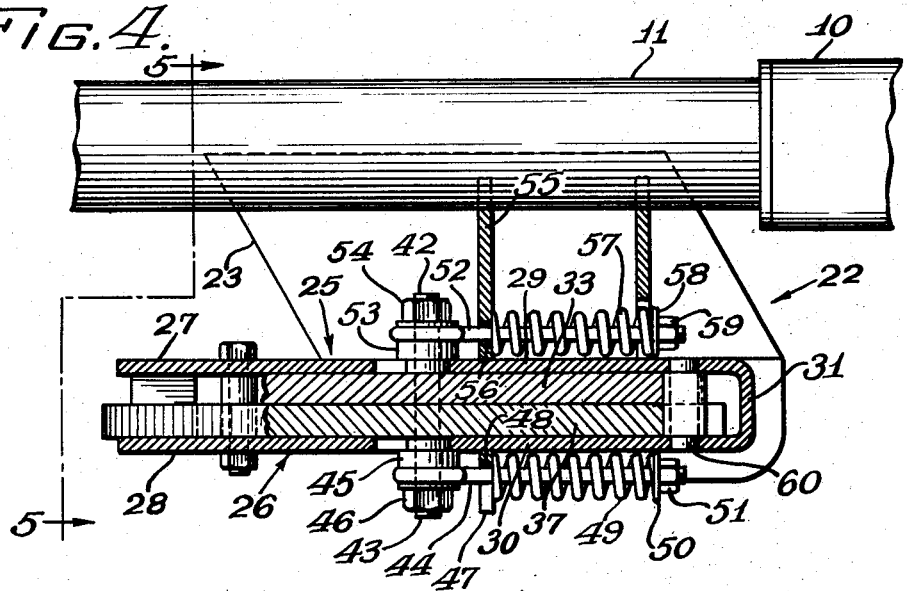
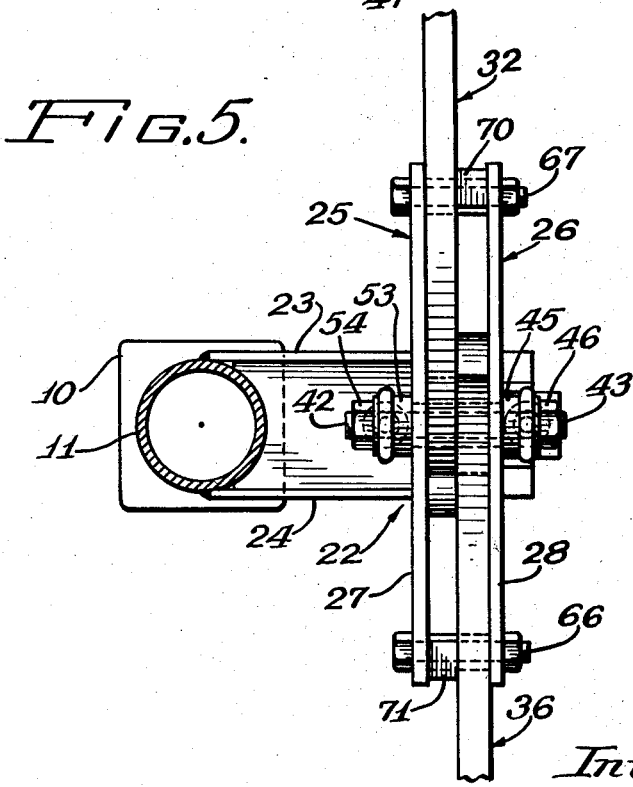
Inventors:
Wayne G. Toland
Donald A. Murray
Paul O. Pippel Atty.

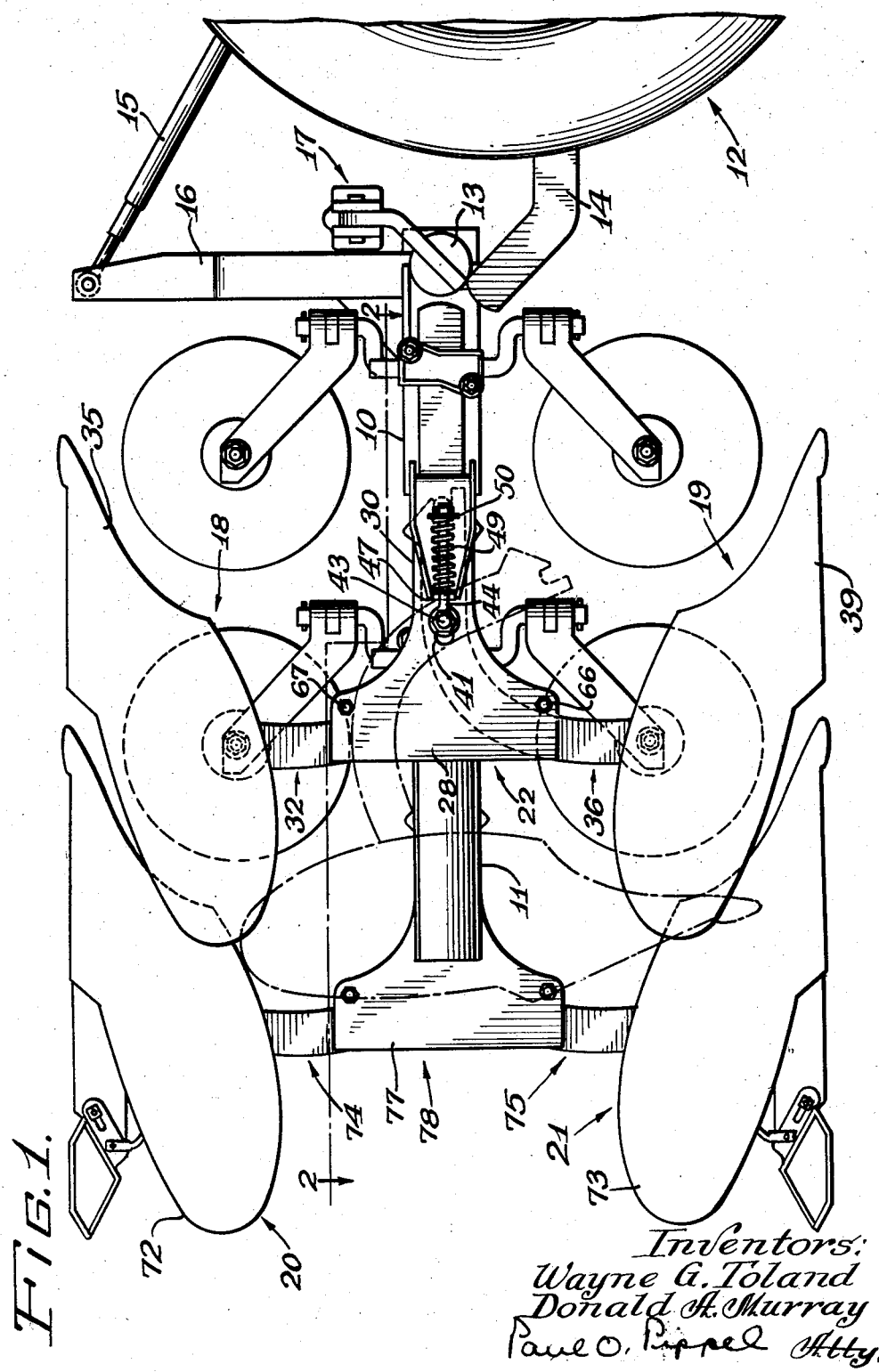

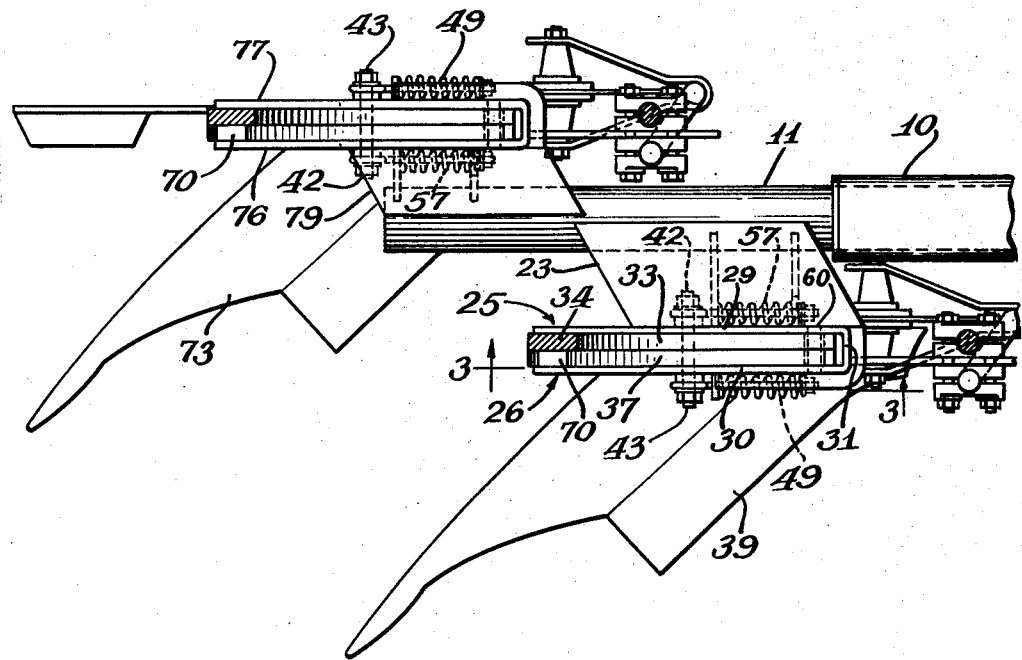
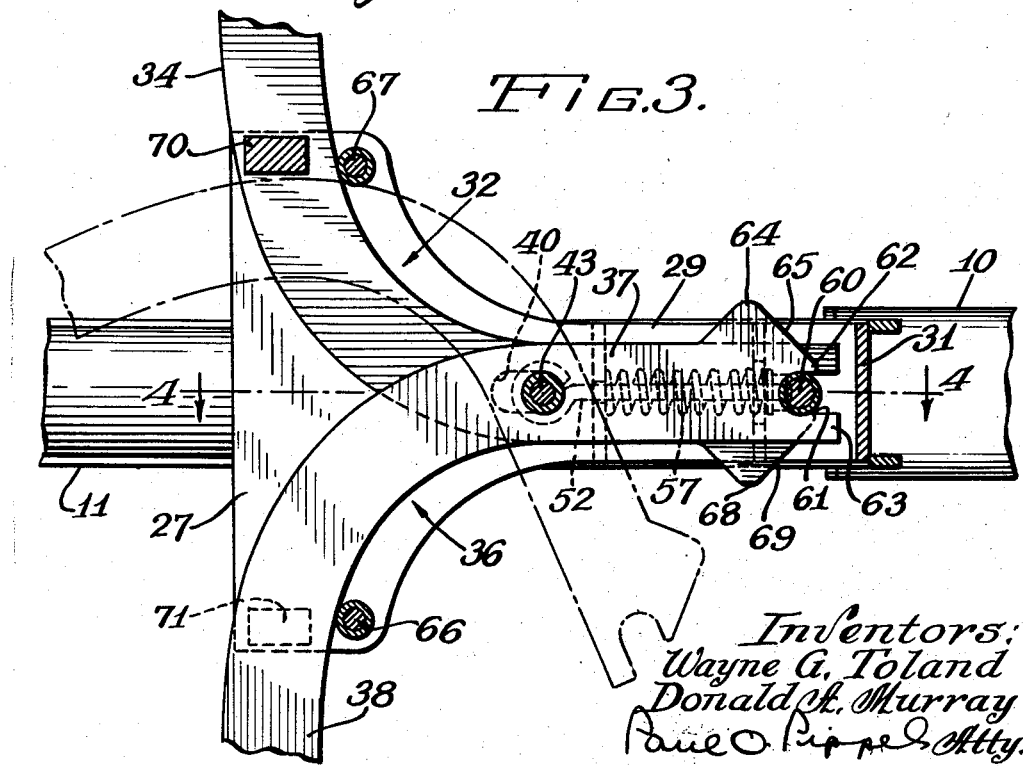

United States Patent Office 2,913,059
Patented Nov. 17, 1959

2,913,059

PLOW BEAM TRIP FOR TWO-WAY PLOW

Wayne G. Toland and Donald A. Murray, Stockton, Calif., assignors to International Harvester Company, a corporation of New Jersey Application April 26, 1956, Serial No. 580,874

4 Claims. (Cl. 172—224)

This invention relates to two-way plows, and particularly to the type of two-way plow wherein alternately operating right and left-hand plowing units are mounted on a support for rotation about an axis extending in the direction of travel of the implement, and the units are oppositely disposed about said axis.

An object of the invention is the provision of a two-way plow of novel construction having a safety trip feature incorporated therein for each plow bottom permitting the operating plow unit to trip when an abnormal draft condition is encountered that would otherwise damage the plow.

Another object of the invention is the provision of an improved two-way plow of the roll-over type, wherein the alternately operating units are spaced 180° about the axis of rotation, and wherein novel tripping mechanism is provided accommodating tripping of the operating plow unit under overload without affecting the non-operating unit.

Another object of the invention is the provision of novel tripping apparatus for a two-way roll-over plow wherein common means are provided for latching both of the alternately operating plow units, while independent means are provided for mounting the units on the support to accommodate tripping of the operating unit without affecting the disposition of the other.

Other objects and advantages of the invention will become clear from the following detailed description when read in conjunction with the accompanying drawings, wherein:

Figure 1 is a view in side elevation illustrating the general construction of a two-way roll-over plow incorporating the features of this invention;

Figure 2 is a plan view, partly in section, of a portion of the structure shown in Figure 1;

Figure 3 is an enlarged detail in side elevation showing the latching means by which the plow units are held against tripping in normal operation, and is a section taken on the line 3—3 of Figure 2;

Figure 4 is a section taken on the line 4—4 of Figure 3; and

Figure 5 is a section on the line 5—5 of Figure 4.

In the drawings the numeral 10 designates a plow support in the form of a rectangularly shaped housing adapted to rotatably receive the forward end of a cylindrical tool carrier 11. The plow of this invention is a two-way roll-over plow adapted for direct connection to a tractor, designated at 12, having power lift means, not shown, thereon for raising the plow to transport position thereon and for controlling the operating depth thereof in any well known manner.

The implement attaching structure of the tractor and the hitch structure of the implement, as well as the means for transmitting power to the tool carrier 11 to rotate it about its axis and that of the supporting frame 10, are not a part of the claimed subject matter of this invention. However, it may be briefly noted that the numeral 13 designates a transversely extending hitch support affixed to the forward end of the support 10 and having secured to opposite ends thereof forwardly extending connecting shafts 14, only one of which is shown. Forming a part of a three-point hitch system is an upper link 15 which extends between the tractor and the upper end of a standard 16 also affixed to the forward end of the frame support 10 centrally thereof. Although the specific apparatus by which the carrier 11 is rotated, as pointed out before, forms no part of this invention, it may be noted that such a power means is indicated generally at 17 and constitutes a hydraulic ram which is connected in any suitable manner, not shown, to the tool carrier 11 to effect rotation thereof to place the alternately operating plow units in operation.

The oppositely disposed alternately operating plow units of this invention are designated at 18 and 19 for the forward pair of units, and 20 and 21 for the rear pair of units of a two-bottom two-way plow. Since the units 20 and 21 are substantially identical with units 18 and 19, only the latter will be described for the purposes of this invention. The plow units 18 and 19 are mounted upon the tool carrier 11 by mechanism including a bracket 22 comprising a pair of vertically spaced plates 23 and 24 affixed at one end to the tool support and extending laterally and horizontally therefrom. Bracket 22 includes a pair of laterally spaced vertically extending plate members 25 and 26 which are generally T-shaped, the broadened head portions 27 and 28, respectively, extending vertically, and the forwardly extending stem portions 29 and 30 being joined at their forward ends to form a bight 31.

The inoperative plow unit 18 shown in Figure 1 comprises a plow beam 32 having a horizontal forwardly extending portion 33 and a rearward upwardly bent portion 34 having mounted thereon a moldboard plow bottom 35. Tool beam 32 is confined between the plates 25 and 26 of bracket 22 alongside and adjacent beam 36 of operating plow unit 19. Forwardly extending horizontal portion 37 of beam 36 lies alongside and adjacent the corresponding horizontal portion 33 of beam 32, while the bent rear end 38 thereof extends downwardly in a direction opposite to the portion 34 of beam 32, and has mounted upon its lower end a moldboard plow bottom 39.

Each of the plow units 18 and 19 is mounted between the plates 25 and 26 of bracket 22 for swinging from the solid line position of Figure 1 to the dotted line position shown for the operating plow beam 36, in response to abnormal draft forces acting upon the implement during operation to swing the plow bottom out of the way until the abnormal draft conditions have been overcome. The plates 25 and 26 are provided, respectively, with longitudinally extendnig slots 40 and 41, while beam 33 has affixed thereto and extending laterally therefrom through slot 40, a pin 42. A pin 43 is affixed to the outside of beam 36 and is received in slot 41. It should thus be clear that each of the beams 32 and 36 is mounted between the plates of bracket 22 for pivotal swinging in a vertical plane about the axes of bolts 42 and 43. It should likewise be clear that the beams 32 and 36 have a lost motion connection with bracket 22 accommodating independent longitudinal movement of the beams relative to the bracket within the confines of the slots 40 and 41.

Longitudinal movement of beams 32 and 36 relative to bracket 22 occurs when abnormal draft forces are encountered, although in normal operating conditions this relative movement does not occur. Rearward movement of the beams in response to overload on the operating plow bottom is resisted, in the case of operating plow bottom 39 by the provision of an eyebolt 44 anchored to a sleeve 45 on the projecting end of bolt 43, and held in place by a nut 46. A laterally projecting lug 47 is affixed to the side of plate 26 and is provided with a groove 48 which slidably receives the elongated shank of bolt 44. A spring 49 surrounds bolt 44 and abuts lug 47 at one end, and at its other end abuts a collar 50 held in place by a nut 51 on the threaded end of the bolt. Longitudinal movement of beam 36 relative to bracket 22 is thus resisted by spring 49.

Another eyebolt 52 is anchored to a sleeve 53 on the projecting end of bolt 42, and is held in place by a nut 54. A lug 55 is provided with a groove 56 which receives the shank of bolt 52, and a coil spring 57 engages lug 55 at one end, and at its other end a collar 58 held in place by a nut 59. Beam 32 is thus capable of longitudinal movement relative to bracket 22 within the limits provided by slot 40, against the action of spring 57.

Means are provided to cause each of the plow units 18 and 19, when in operation, to trip when excess draft is encountered by the associated plow bottom 35 or 39. Latching means are provided for normally holding the plow units 18 and 19, as well as the plow units 20 and 21, against tripping in normal operation. Common latching mechanism is provided for both plow units and includes a transverse pin 60 anchored in the forward ends of plates 25 and 26. The forward end of beam 36 of operating unit 19 is provided with a notch 61 in which pin 60 is received formed with a short upper lip 62 and an elongated lower lip 63. In operation, when working power unit 19, for example, encounters an obstruction beam 36 moves rearwardly against the action of spring 49 until lip 62 clears pin 60 and beam 36 swings to the dotted line position indicated in Figure 1. Since beams 32 and 36 are independently mounted in bracket 22 by pins 42 and 43, only the operating plow unit, in this case 19, trips. The notch in the forward end of beam 32 corresponds exactly to the notch in the forward end of beam 36 and pin 60 remains therein when the operating plow unit is tripped.

Although pins 42 and 43 are preferably separate pins, if desired a single pin 42 or 43 may be utilized and extended through both beams and the slots in plates 25 and 26. In such case the beams 32 and 36 both move rearwardly when an obstruction is met, the operating beam swinging to tripped position because of the pressure of the soil, while the inactive plow beam in the elevated position is frictionally held between the other beam and the adjacent side plate.

After the obstruction that caused the operating plow unit to trip has been passed, the tractor and implement are backed up and engagement of the ground with the plow bottom swings the associated beam counterclockwise about its pivot on the bracket. The upper edge of the forward end of beam 36 is provided with a triangular projection or hump 64 and the forward slanted face 65 thereof acts as a cam surface engaging pin or roller 60 which rides down the face 65 until it is received in the notch. When the implement reaches the end of a field and the tractor and implement are turned to reverse the direction of plowing, the tool carrier 11 is rotated 180° to place the plow unit 18 as well as the rear unit 20 in operating position while the operating units 19 and 21 are elevated to a non-operating position. The plow unit 18, as well as the plow unit 20, then become the operating units and are tripped and returned to operating position in exactly the same way as previously described. In the case of the plow unit 19, forward swinging of beam 36 is limited by the provision of a bolt 66 carried by the plates 27 and 28, and a similar bolt 67 is provided to limit the forward swinging of beam 32. A similar triangularly shaped hump 68 having a forward angled face 69 is provided on the forward end of beam 32 for use when the plow unit 18 is in operation. The elongation of the lip 63 beyond the end of upper lip 62 in the case of the operating plow unit assures the reception of pin 60 in the associated slot and prevents the pin from overriding the slot.

As is particularly clear from Figures 4 and 5, beams 32 and 36 are centrally mounted upon pins 42 and 43 for pivoting in slots 40 and 41, respectively, and the oppositely directed portions 34 and 38 of the beams engage the inner faces respectively of vertical portions 27 and 28 of bracket 22. To confine and guide the respective plow beams and to hold them securely between the plates of the bracket, a spacer in the form of a rectangular block 70 is affixed to and projects inwardly from the upper wall of vertical plane portion 28, engaging the adjacent face of beam 32 to confine and guide the beam in its swinging movement, and another rectangular spacing block 71 is affixed to the inner wall of vertical plate portion 27 and projects inwardly to engage and confine the tool beam 36.

The rear units 20 and 21 include, respectively, plow bottoms 72 and 73 mounted upon the ends of tool beams 74 and 75 between the plates 76 and 77 of a bracket 78, which are affixed to the ends of a pair of vertically spaced members 79 secured to and projecting from the carrier 11 on the side opposite the members 23 and 24. The manner in which beams 74 and 75 are mounted between plates 76 and 77 of bracket 78 is exactly the same as for beams 32 and 36 of the forward plow units. The latching mechanism for the plow units is likewise exactly the same as for the forward units and like numerals represent like parts.

The operation of the two-way roll-over plow of this invention should be clearly understood from the foregoing description and it should likewise be understood that the invention has been described in its preferred embodiment only and that modifications may be made therein without departing from the spirit thereof or the scope of the appended claims.

What is claimed is:

1. In a two-way plow of the type wherein right and left-hand plow units ar supportable above the ground for transport and are movable between positions to place the units alternately in operation, the combination of a tool support rotatable about a longitudinal axis, a pair of brackets carried by said support, a pair of right and left hand tool-carrying beams confined between said brackets in side by side relationship, said beams having oppositely vertically directed tool-carrying rear portions and coextensive horizontal forwardly extending portions, transversely aligned pivot pins carried by said beams, each of said brackets having an opening therein to receive one of said pins, whereby said beams are independently pivotable about a common transverse axis, locking means on the forward ends of said beams and said brackets cooperative to hold said beams against pivoting about the axis of said pins to a tripped position comprising means serving as a common latch pin carried by said brackets, each of said beams having a notch therein to receive said pin and lock the beam, said locking means being releasable under overload to accommodate tripping of one of said beams and adapted to retain the other beam in locked position.

2. The invention set forth in claim 1, wherein the forward end of each of said beams is provided with a notch, and a single latch pin carried by the brackets is received in both of said notches and the mounting of each of said pivot pins in its bracket includes lost motion accommodating limited longitudinal movement of the operating plow unit relative to the support prior to release of the associated locking means.

3. A two-way plow comprising a longitudinally extending support, a pair of alternately operable right and left-hand plow units mounted on the support for rotation about a longitudinal axis to dispose one of said plow units in operation while the other is retained in a non-operating position, means for mounting said plow units on the support for independent pivotal movement thereof about a transverse axis to a tripped position when abnormal draft conditions are encountered, and common latching means for said plow units adapted to retain both of said units against tripping in normal operation, said latching means being releasable under overload to accommodate tripping of the operating plow unit while retaining the other unit in its non-operating position.

4. The invention set forth in claim 3, wherein said latching means includes notches in said plow units and a single latching pin carried by the support for reception in said notches to prevent tripping of the operating plow unit and the means for pivotally mounting said units on the support includes means accommodating limited independent longitudinal movement of the operating unit relative to the other unit to release said unit from operative engagement with said latching pin.

References Cited in the file of this patent

UNITED STATES PATENTS

| | | |
|---|---|---|
| 1,078,871 | Olson | Nov. 18, 1913 |
| 1,108,174 | Hollingsworth | Aug. 25, 1914 |
| 1,309,498 | Waters | July 8, 1919 |
| 1,537,841 | McCarter | May 12, 1925 |

FOREIGN PATENTS

| | | |
|---|---|---|
| 1,036,052 | France | Apr. 22, 1953 |